(12) United States Patent
Van Berkel (10) Patent No.: US 8,384,747 B2
(45) Date of Patent: Feb. 26, 2013

(54) AUTOSTEREOSCOPIC DISPLAY APPARATUS AND COLOUR FILTER THEREFOR

(75) Inventor: Cornelis Van Berkel, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1143 days.

(21) Appl. No.: 11/908,410

(22) PCT Filed: Mar. 14, 2006

(86) PCT No.: PCT/IB2006/050797
§ 371 (c)(1),
(2), (4) Date: Sep. 12, 2007

(87) PCT Pub. No.: WO2006/097897
PCT Pub. Date: Sep. 21, 2006

(65) Prior Publication Data
US 2008/0191966 A1 Aug. 14, 2008

(30) Foreign Application Priority Data
Mar. 17, 2005 (EP) ...................................... 05102097

(51) Int. Cl.
*G09G 5/02* (2006.01)
(52) U.S. Cl. ...................................................... 345/694
(58) Field of Classification Search ............ 345/87–104, 345/692, 613, 694–696
See application file for complete search history.

(56) References Cited

U.S. PATENT DOCUMENTS

| | | | |
|---|---|---|---|
| 6,064,424 A * | 5/2000 | van Berkel et al. ............. | 348/51 |
| 6,069,650 A | 5/2000 | Battersby | |
| 6,281,861 B1 * | 8/2001 | Harrold ............................ | 345/32 |
| 6,307,585 B1 * | 10/2001 | Hentschke ...................... | 348/51 |
| 6,603,504 B1 | 8/2003 | Son et al. | |
| 7,564,507 B2 | 7/2009 | Park | |
| 2001/0050686 A1 * | 12/2001 | Allen ............................. | 345/543 |
| 2003/0011884 A1 * | 1/2003 | Van Berkel .................... | 359/464 |
| 2004/0263451 A1 * | 12/2004 | Muto ............................. | 345/87 |
| 2005/0001787 A1 | 1/2005 | Montgomery et al. | |
| 2005/0083246 A1 * | 4/2005 | Saishu et al. .................. | 345/1.1 |
| 2005/0225575 A1 * | 10/2005 | Brown et al. .................. | 345/694 |

(Continued)

FOREIGN PATENT DOCUMENTS

EP 0625861 A2 11/1994
EP 0752610 A2 1/1997

(Continued)

OTHER PUBLICATIONS

Van Berkel: "Image Preparation for 3D-LCD"; Proc. SPIE, Vol. 3639, pp. 84-91, 1999.

*Primary Examiner* — Chanh Nguyen
*Assistant Examiner* — Sanghyuk Park (57) ABSTRACT

An autostereoscopic display apparatus includes a plurality of colored individually addressable display elements (2) arranged in an array of rows and columns. A lenticular sheet (15) includes a plurality of light directing elements, for example lenticular elements (16). A color order of the individually addressable display elements (2) in the row direction (4) provides triplets (21; 23; 24) of adjacent individually addressable display elements (2), each individually addressable display element (2) of a triplet (21; 23; 24) being a respective one of the colors (R, G, B) of the display. The internal color order of the individually addressable display elements (2) within a triplet (21; 23; 24) is different for different triplets (21; 23; 24) in at least one of the row direction (4) and the column direction (6).

18 Claims, 6 Drawing Sheets

U.S. PATENT DOCUMENTS

| | | | |
|---|---|---|---|
| 2006/0098033 A1* | 5/2006 | Langendijk | 345/694 |
| 2006/0098296 A1* | 5/2006 | Woodgate et al. | 359/642 |
| 2006/0170616 A1 | 8/2006 | Hirayama et al. | |
| 2006/0170764 A1* | 8/2006 | Hentschke | 348/42 |
| 2007/0188517 A1* | 8/2007 | Takaki | 345/613 |

FOREIGN PATENT DOCUMENTS

| | | |
|---|---|---|
| EP | 0791847 A1 | 8/1997 |
| GB | 2196166 A | 4/1988 |
| JP | 9236777 A | 9/1997 |
| JP | 2004040722 A | 2/2004 |
| JP | 2004264858 A | 9/2004 |
| JP | 2005045496 A | 2/2005 |
| JP | 2005110022 A | 4/2005 |
| JP | 2005234198 A | 9/2005 |
| WO | WO9406249 A1 | 3/1994 |
| WO | WO2005006775 A1 | 1/2005 |
| WO | WO2005006777 A2 | 1/2005 |

* cited by examiner

AUTOSTEREOSCOPIC DISPLAY APPARATUS AND COLOUR FILTER THEREFOR

The present invention relates to colour autostereoscopic display apparatus. The present invention relates in particular to, but is not limited to, autostereoscopic display apparatus switchable between an autostereoscopic display mode and a two-dimensional (2-D) display mode.

Stereoscopic displays provide an image that is made up of different sub-images at different viewing points. If suitably adjusted different sub-images (i.e. with appropriate binocular disparity) are provided to the left eye and the right eye of a viewer, the overall image is perceived by the viewer as a three dimensional image. One known method to provide differing images is by varying the colour content, with the viewer needing to wear special spectacles with a different colour-absorbing lens in each eyepiece.

Stereoscopic displays that provide an image made up of different sub-images at different viewing points without the viewer needing to wear special spectacles are known as autostereoscopic displays. A typical autostereoscopic display comprises a matrix liquid crystal display (LCD) panel comprising an array of display elements arranged in rows and columns. The display further comprises means for directing output light from the array of display elements such that the visual output provided from a given point on the display panel is dependent upon the viewing angle. This means that the right eye of a viewer will see a different view to that seen by the left eye, providing the desired stereoscopic or three-dimensional image.

A well known form of the output light directing means is a lenticular sheet overlying the display panel. A lenticular sheet, for example in the form of a moulded or machined sheet of polymer material, overlies the output side of the display panel with its lenticular elements, comprising (semi) cylindrical lens elements, extending in the column direction with each lenticular element being associated with a respective group of two, or more, adjacent columns of display elements and extending parallel with the display element columns. In an arrangement in which each lenticule is associated with two columns of display elements, the display panel is driven to display a composite image comprising two 2-D sub-images vertically interleaved, with alternate columns of display elements displaying the two images, and the display elements in each column providing a vertical slice of the respective 2-D sub-image. The lenticular sheet directs these two slices, and corresponding slices from the display element columns associated with the other lenticules, to the left and right eyes respectively of a viewer in front of the sheet so that, with the sub-images having appropriate binocular disparity, the viewer perceives a single stereoscopic image. In other, so-called multi-view, arrangements, in which each lenticule is associated with a group of more than two adjacent display elements in the row direction and corresponding columns of display elements in each group are arranged appropriately to provide a vertical slice from a respective 2-D (sub-) image, then as a viewer's head moves a series of successive, different, stereoscopic views are perceived for creating, for example, a greater degree of viewing freedom and/or a look-around impression.

Autostereoscopic display apparatus of this kind can be used for various applications, for example in medical imaging, virtual reality, games, mobile telephone and CAD fields.

Autostereoscopic display apparatus switchable between 2-D and autostereoscopic operation are known. This is provided, for example, by provision of a diffusion layer switchable between diffusing and non-diffusing, such that the diffusing state cancels out the light directional effect of the lenticular lens, thus reducing the autostereoscopic view to a 2-D view.

Typically, in autostereoscopic mode, spatial resolution is lost due to the provision of separate individually addressable display elements of a given colour for different views along the row direction in a given pixel. This is exacerbated in the case of multi-view arrangements where more than two, e.g. 6, different views are provided for each pixel, i.e. in the 6-view case, in each pixel there will be six individually addressable display elements of a given colour. This reduces the spatial resolution by a factor of 6 in the "along-the-row" direction (hereinafter referred to as "row direction").

The effect of the spatial resolution loss in an autostereoscopic display, as discussed above, has been alleviated by the use of slanted orientation of the lenticular lens relative to the column direction of the pixels, as disclosed for example in EP-A-0 791 847. Broadly speaking, such an arrangement tends to "share" the loss of resolution between row and column direction, thus reducing the starkness of the resolution in the row direction, especially for larger numbers of view multi-view displays.

However, the benefits of the slanted lenticular lens type of devices are dependent on the number of views, combined with pixel pitch, and other factors, and thus effectively inherent performance and/or design flexibility limitations are present in such autostereoscopic displays. Further details of such limitations are discussed in the article "Image preparation for 3D-LCD", Cees van Berkel, proc SPIE, vol. 3639, pages 84-91, 1999.

Figure 1:
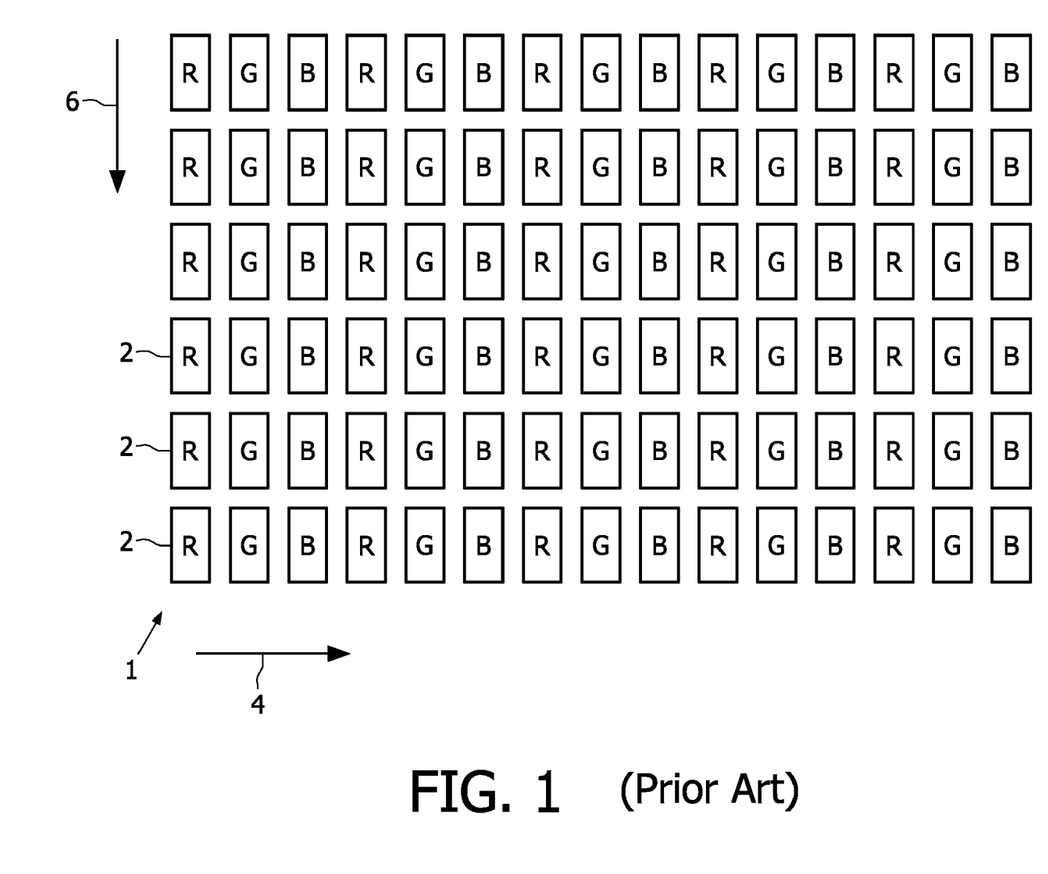
FIG. 1 shows (not to scale) the conventional layout of individually addressable display elements of respective colours red, blue and green (indicated as R, G or B respectively) in a conventional colour filter.

The above mentioned limitations derive at least in part from geometric limitations resulting from the use of a conventional colour filter layout, in particular the relative arrangement of the individually addressable display elements of respective colours red, blue and green. FIG. 1 shows (not to scale) the conventional layout of individually addressable display elements 2 of respective colours red, blue and green (indicated as R, G or B respectively) in a conventional colour filter 1. The colours are arranged in repeating cycles of red then green then blue in the row direction 4. This results in all the individually addressable display elements 2 of a given column, i.e. in the column direction 6, being of a same colour, i.e. in FIG. 1, all the individually addressable display elements 2 in the first column are red, all the individually addressable display elements 2 in the second column are green, all the individually addressable display elements 2 in a third column are blue, all the individually addressable display elements 2 in a fourth column are red, and so on.

Various prior art references disclose autostereoscopic display devices in which some of the limiting effects of a conventional colour filter, such as that shown in FIG. 1, are alleviated by provision of a different layout of individually addressable display elements of respective colours red, blue and green. For example, EP-A-0 791 847 discloses an arrangement in which all the individually addressable display elements of a given row are the same colour; and both EP-A-0 791 847 and WO 2005/006777 disclose arrangements in which plural adjacent individually addressable display elements in a row are of a same first colour, with other plural adjacent individually addressable display elements in the row being of a same second colour as each other but different to the first colour, and so on. Such colour filter layouts tend to improve the autostereoscopic performance by, in some way or other, grouping individually addressable display elements of a given colour together in the row direction.

The present inventor has realised that known colour filter layouts intended tend to improve the autostereoscopic performance, such as those disclosed for example in EP-A-0 791 847 and WO 2005/006777, do not take account of the effect of such layouts on 2-D operation of a display device switchable between 2-D operation and autostereoscopic operation. The present inventor has further realised that it would be desirable to derive colour filter layouts that improve autostereoscopic operation, whilst causing less or no detriment to 2-D operation.

In a first aspect, the present invention provides an autostereoscopic display apparatus, comprising: a plurality of coloured individually addressable display elements arranged in an array of rows and columns; and light directing means, for example a lenticular sheet, comprising a plurality of light directing elements, for example lenticular elements; wherein the colour order of the individually addressable display elements in the row direction provides triplets of adjacent individually addressable display elements, each individually addressable display element of a triplet being a respective one of the colours of the display, e.g. R-G-B; and the internal colour order of the individually addressable display elements within a triplet is different for different triplets in at least one of the row direction and the column direction.

The internal colour order of the individually addressable display elements within a triplet may be different for each adjacent triplet in at least one of the row direction and the column direction.

The internal colour order of the individually addressable display elements within a triplet may be rotated between different triplets in at least one of the row direction and the column direction.

The internal colour order of the individually addressable display elements within a triplet may be different for different triplets in at least one of the row direction and the column direction such that adjacent individually addressable display elements in the at least one of the row direction and the column direction are always of different colour to each other.

The light directing elements of the light directing means may be arranged at a slanted angle relative to the column direction of the array of individually addressable display elements.

The autostereoscopic display apparatus may further comprise switching means, for example active lens or a switchable diffuser, such that the autostereoscopic display apparatus is switchable between an autostereoscopic display mode and a 2-D display mode.

The colours of the display may be red, green and blue.

In a further aspect, the present invention provides a colour filter for use in a display, the colour filter comprising a plurality of individual colour filter elements arranged in an array of rows and columns, wherein the colour order of the colour filter elements in the row direction provides triplets of adjacent individual colour filter elements, each individual colour filter element of a triplet being a respective one of the colours of the colour filter; and the internal colour order of the individual colour filter elements within a triplet is different for different triplets in at least one of the row direction and the column direction.

The internal colour order of the individual colour filter elements within a triplet may be different for each adjacent triplet in at least one of the row direction and the column direction.

The internal colour order of the individual colour filter elements within a triplet may be rotated between different triplets in at least one of the row direction and the column direction.

The internal colour order of the individual colour filter elements within a triplet may be different for different triplets in at least one of the row direction and the column direction such that adjacent individual colour filter elements in the at least one of the row direction and the column direction are always of different colour to each other.

The colours of the colour filter may be red, green and blue.

In a further aspect, the present invention provides an autostereoscopic display or colour filter in which the colour order within 2-D triplets is changed in the row direction, i.e. along a row, but is not changed in the column direction, i.e. is not changed from row to row.

In a further aspect, the present invention provides an autostereoscopic display or colour filter in which the colour order within 2-D triplets is changed in the column direction, i.e. from row to row, but is not changed in the row direction, i.e. along a row.

In a further aspect, the present invention provides an autostereoscopic display or colour filter in which the colour order within 2-D triplets is changed in both the row direction, i.e. along a row, and in the column direction, i.e. from row to row.

Embodiments of the present invention will now be described, by way of example, with reference to the accompanying drawings, in which.

Figure 2:
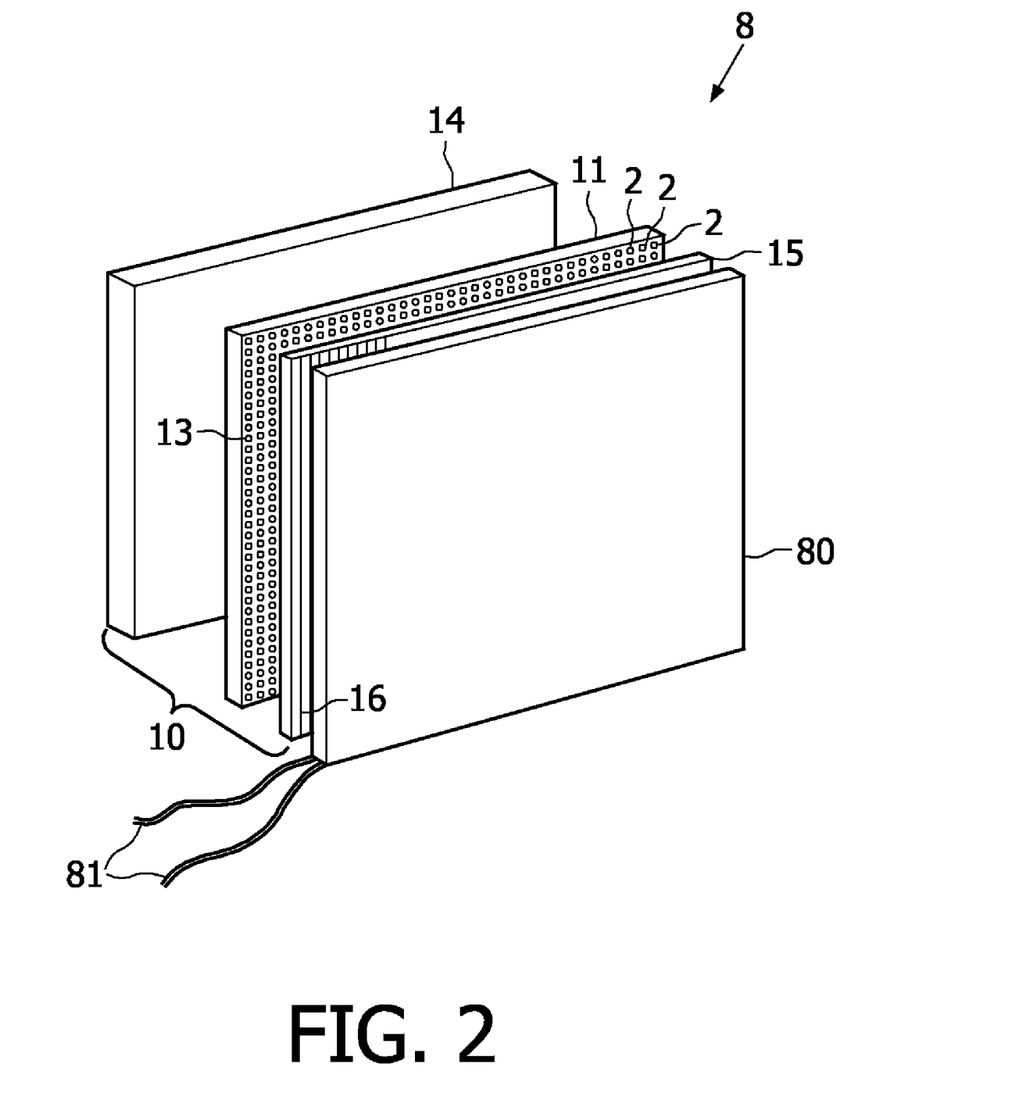
FIG. 2 is a schematic perspective view of a switchable (between autostereoscopic operation and 2-D operation) colour display apparatus.

FIG. 2 is a schematic perspective view of a switchable (between autostereoscopic operation and 2-D operation) colour display apparatus 8 comprising an autostereoscopic display means 10 and an electrically switchable light diffuser 80.

The autostereoscopic display 10 comprises an active colour matrix liquid crystal display (AMLCD) panel 11 used as a spatial light modulator and having a planar array of individually addressable display elements 2 arranged in aligned rows and columns perpendicular to one another, i.e. each individually addressable display element 2 in a given row (except for the first row) is directly below an individually addressable display element 2 of the row above the given row. A respective colour for each individually addressable display elements 2 is provided by a colour filter 13. The individually addressable display elements 2 are shown schematically with only a comparatively few in each row and column for simplicity. The display panel 11 is illuminated by a light source 14 which can be of any suitable kind and in this example comprises a planar back-light co-extensive with the area of the display element array. Light incident on the panel is modulated by the individually addressable display elements 2 by the application of appropriate drive voltages thereto so as to produce the desired image display output.

Overlying the output side of the display panel 11, there is disposed a lenticular sheet 15 providing an array of elongate, parallel, lenticular elements 16. The lenticular elements 16 comprise optically cylindrically converging lenticules, for example formed as convex cylindrical lenses which extend parallel to the columns of individually addressable display elements 2 and serve in a known manner to provide separate images, which are generated in the array of the display panel 11 in a vertically interleaved fashion, to the two eyes of a viewer facing the side of the lenticular sheet 15 remote from the display panel 11 so that a stereoscopic, or 3-D, image can be perceived. Autostereoscopic display apparatus using lenticular sheets in conjunction with matrix display panels are well known and it is not thought necessary to describe here in detail their operation. Examples of such apparatus and their operation are described or referenced in US-A1-2003/0011884 and in GB-A-2196166, both of whose contents are incorporated herein by reference. Each lenticular element 16 may overlie a respective group of two, three, or more, adjacent columns of individually addressable display elements 2, to provide a corresponding number of views.

Each lenticular element provides a spatially discrete output beam from each of the associated pixel columns in mutually different, angular directions. The display panel is driven so that a narrow vertical slice of a 2-D (sub) image is produced by each column of sub-pixels with the display produced comprising a plurality of interleaved 2-D (sub) images which are to be seen by the left and right eye respectively of a viewer. Each lenticular element 16 thus provides a plurality of output beams, one from each of its associated columns of sub-pixels, whose optical axes are in mutually different directions and angularly spread around the longitudinal axis of the lenticular element. With appropriate 2-D image information applied to respective columns of display elements then to a viewer whose eyes receive different ones of the beams a 3-D image is perceived. With each lenticular element being associated with a plurality of several sub-pixel columns then different stereoscopic images or image pairs can be viewed as the viewer's head moves in the row direction. In other embodiments, the lenticular elements may be substantially aligned with the sub-pixel columns, however in this embodiment they are slanted with respect to the columns, as will be described in more detail below with reference to FIG. 3, and as is described in EP-A-0 791 847, whose contents are incorporated herein by reference.

Figure 3:
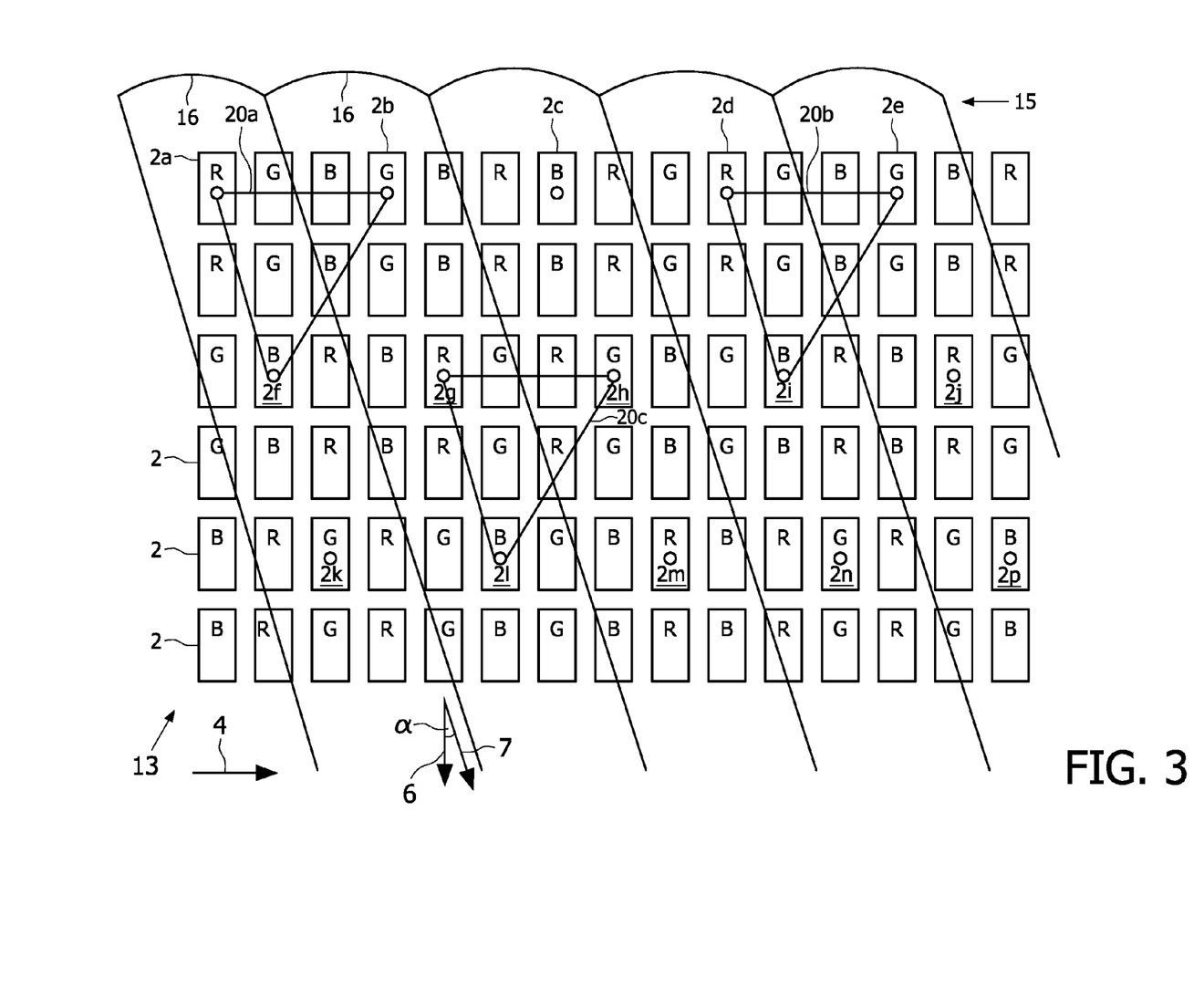
FIG. 3 shows (not to scale) further details of a colour filter and lenticular sheet of the colour display apparatus of FIG. 2.

FIG. 3 shows (not to scale) further details of the colour filter 13 and lenticular sheet 15 of the colour display apparatus 8. The individually addressable display elements 2 are arranged in rows and columns. For clarity, only the first six rows and the first fifteen columns are shown, although the display comprises many more rows and columns. The colour filter 13 provides one of the colours red (indicated as R), green (indicated as G), or blue (indicated as B) to each individually addressable display element 2.

The respective colours red, blue and green of the individually addressable display elements are arranged as follows. In the first row, the order of the first nine elements is R-G-B-G-B-R-B-R-G, and then this is repeated for the next nine elements (of which only the first six elements are shown in FIG. 3), and so on. In the second row the order is the same as in the first row. In the third row, the order of the first nine elements is G-B-R-B-R-G-R-G-B, and then this is repeated for the next nine elements (of which only the first six elements are shown in FIG. 3), and so on. In the fourth row the order is the same as in the second row. In the fifth row, the order of the first nine elements is B-R-G-R-G-B-G-B-R, and then this is repeated for the next nine elements (of which only the first six elements are shown in FIG. 3), and so on. In the sixth row the order is the same as in the fifth row. The seventh to twelfth rows (not shown) repeat the arrangement of the first six rows, and so on.

The lenticular sheet 15 comprises longitudinal lenticular elements 16. The lenticular elements 16 are arranged slanted with respect to the columns of individually addressable display elements 2, that is, the main longitudinal axis 7 of the lenticular elements 16 is at an angle α to the column direction 6 of the array of individually addressable display elements 2.

The pitch of the lenticular elements 16 is chosen in relation to the pitch of the individually addressable display elements 2 in the row direction 4 according to the number of views required, and each lenticular element 16, apart from those at the sides of the display element array, extends from top to bottom of the display element array. In this embodiment the autostereoscopic display 10 is a 6-view display, that is the lenticular elements 16 are of such a width with respect to the pitch of the individually addressable display elements 2 in a row, and the slant angle α is such as to provide a 6-view arrangement. Further details relating to the number of views is given in EP-A-0 791 847, which is incorporated herein by reference.

By way of example, FIG. 3 shows further details of one of the 6 views provided by the autostereoscopic operation of the autostereoscopic display 10. In particular, those individually addressable display elements 2 that are visible to a viewer in the example view (one of the 6 overall views) are shown in FIG. 3 by a "o" drawn in their centre, and furthermore they are individually identified as individually addressable display elements 2a, 2b, 2c, 2d, 2e, 2f, 2g, 2h, 2i, 2j, 2k, 2l, 2m, 2n and 2p. Note that these individually addressable display elements 2a, 2b, 2c, 2d, 2e, 2f, 2g, 2h, 2i, 2j, 2k, 2l, 2m, 2n and 2p each lie on a centre-line longitudinal axis (not shown) of a lenticular element 16 of the lenticular sheet 15. In operation, the different individually addressable display elements 2 are driven such that three individually addressable display elements 2, one of each colour, provide a triplet of individually addressable display elements 2 providing one coloured picture element (pixel) viewed by the viewer in a given autostereoscopic view. For the particular view provided by the individually addressable display elements 2a, 2b, 2c, 2d, 2e, 2f, 2g, 2h, 2i, 2j, 2k, 2l, 2m, 2n and 2p, three such autostereoscopic triplets/pixels are shown in FIG. 3 by triangles drawn between the three individually addressable display elements forming the respective triplet/pixel, namely a first autostereoscopic triplet 20a, a second autostereoscopic triplet 20b, and a third autostereoscopic triplet 20c. The first autostereoscopic triplet 20a is made up of the red individually addressable display element 2a, the green individually addressable display element 2b, and the blue individually addressable display element 2f. The second autostereoscopic triplet 20b is made up of the red individually addressable display element 2d, the green individually addressable display element 2e, and the blue individually addressable display element 2i. The third autostereoscopic triplet 20c is made up of the red individually addressable display element 2g, the green individually addressable display element 2h, and the blue individually addressable display element 2l. The other individually addressable display elements 2c, 2j, 2k, 2m 2n and 2p viewed in this view also contribute to forming autostereoscopic triplets/pixels which cannot however be represented by connected triangles in FIG. 3 as they include individually addressable display elements 2 outside of the particular 6 rows and 9 columns shown by way of example in FIG. 3.

The arrangement of the autostereoscopic triplets/pixels 20a, 20b, 20c (and others not shown) for the given view, and corresponding arrangement of the autostereoscopic triplets/pixels for the other 5 views of the 6-view stereoscopic display, derived from the layout of the colour filter 13, is advantageous in terms of the autostereoscopic operation for various reasons. For example, loss of spatial resolution (compared to 2-D view) is shared between the row direction 4 and the column direction 6, i.e. the overall resolution loss to a factor of ⅙ being shared by a loss to a factor of ½ in the row direction 4 and a loss to a factor of ⅓ in the column direction 6. Furthermore, this efficient autostereoscopic arrangement is achieved without design restrictions on degrees of freedom of number of views, pixel pitch, etc., that otherwise result from use of the colour layout of the conventional colour filter 1 shown by way of comparison in FIG. 1.

However, notwithstanding the above described advantages in terms of autostereoscopic operation alone, further major benefits in terms of the 2-D operation of the switchable (between autostereoscopic operation and 2-D operation) colour display apparatus 8 of the present embodiment will now be described with reference to FIG. 4.

The switchable (between autostereoscopic operation and 2-D operation) colour display apparatus 8 is operated in 2-D mode by switching the diffuser 80 to a diffusing state, such that the directional effect of the lenticular sheet 15 is negated. Additionally, during 2-D operation, the individually addressable display elements 2 are driven such that three adjacent individually addressable display elements 2 in a row serve as a 2-D colour triplet/pixel, in conventional fashion.

Figure 4:
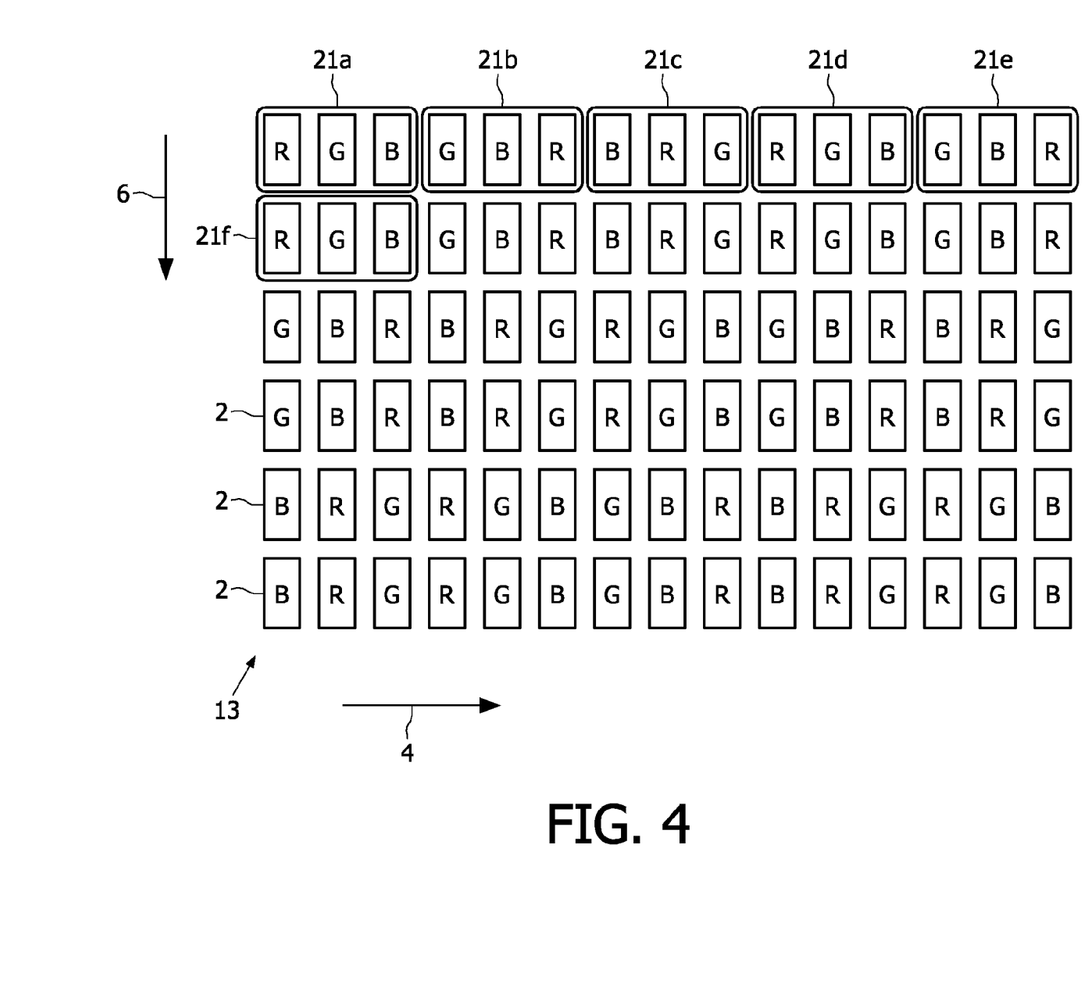
FIG. 4 shows some 2-D triplets of the colour filter of the colour display apparatus of FIG. 2.

FIG. 4 shows, by way of example, some of these 2-D triplets of the colour filter 13 of the colour display apparatus 8 (note that the lenticular sheet 15 is not shown in FIG. 4, partly for clarity, but also because it has substantially no effect in the 2-D mode of operation).

FIG. 4 shows in particular a first 2-D triplet 21*a*, a second 2-D triplet 21*b*, a third 2-D triplet 21*c*, a fourth 2-D triplet 21*d*, a fifth 2-D triplet 21*e* and a sixth 2-D triplet 21*f*. The first-fifth triplets 21*a*-21*e* are on the first row, the sixth triplet 21*f* is on the second row. As a consequence of the repeating R-G-B-G-B-R-B-R-G colour layout of the individually addressable display elements 2 on the first and second rows, the colour order of the respective individually addressable display elements 2 in the different triplets is as follows:

the order of the respective colours of the individually addressable display elements 2 in the first 2-D triplet 21*a* is R-G-B;

the order of the respective colours of the individually addressable display elements 2 in the second 2-D triplet 21*b* is G-B-R;

the order of the respective colours of the individually addressable display elements 2 in the third 2-D triplet 21*c* is B-R-G;

the order of the respective colours of the individually addressable display elements 2 in the fourth 2-D triplet 21*d* is R-G-B (i.e. a repeat of the first 2-D triplet 21*a*);

the order of the respective colours of the individually addressable display elements 2 in the fifth 2-D triplet 21*e* is G-B-R (i.e. a repeat of the second 2-D triplet 21*b*);

and so on along the first row, i.e. the next 2-D triplet of the first row (not shown will be B-R-G, i.e. a repeat of the third 2-D triplet 21*c*, such that along the row sets of three triplets corresponding to triplets 21*a*-21*c* are repeated;

and the second row is a repeat if the first row, such that the first triplet of the second row, namely sixth 2-D triplet 21*f* as shown in FIG. 4, is R-G-B i.e. the same as the triplet positioned above it, i.e. the first triplet 21*a* of the first row.

The above described colour layout of the individually addressable display elements 2 in the colour filter 13, in terms of the 2-D triplets 21*a*-21*f*, may be considered as being arranged such that the internal colour order within a triplet is changed, more particularly rotated or shifted, when comparing a triplet to an adjacent triplet along the row. That is, for example, in the first 2-D triplet 21*a* the internal colour order is R-G-B, i.e. the colour red occupies the first (or left-hand) individually addressable display element 2 of the triplet, the colour green occupies the second (or middle) individually addressable display element 2 of the triplet, and finally the colour blue occupies the third (or right-hand) individually addressable display element of the triplet; whereas in the adjacent second 2-D triplet 21*b* the internal colour order is G-B-R, i.e. the colour green now occupies the first (or left-hand) individually addressable display element 2 of the triplet, the colour blue now occupies the second (or middle) individually addressable display element 2 of the triplet, and finally the colour red now occupies the third (or right-hand) individually addressable display element of the triplet; i.e. the internal colour order has been rotated (or shifted) one position to the left, with green taking the place of blue, blue taking the place of green, and red taking the place of blue.

The above described rotation, along the row direction 4, of the internal colour order within the 2-D triplets advantageously means, for example, that although the colour layout is different to the conventional layout of FIG. 1, and consequently provides autostereoscopic improvements as described above with reference to FIG. 3, nevertheless, unlike the examples given in e.g. EP-A-0 791 847 and WO 2005/006777, adjacent individually addressable display elements 2 are always of different colour in this embodiment, thus avoiding or reducing 2-D display artefacts which would otherwise be produced. Furthermore, unlike other prior art examples of colour layouts giving improvement to autostereoscopic operation, the rotation of this embodiment also more generally provides for the 2-D triplets to remain intact, i.e. the three individually addressable display elements 2 of each 2-D triplet remain adjacent to each other, which gives optimum resolution.

In this embodiment, as the second row is a repeat of the first row, there is no rotation or shift in the internal colour order within adjacent 2-D triplets in the column direction 6 between the first and second rows, e.g. the colour order of R-G-B within the sixth 2-D triplet 21*f* is the same as that within the first 2-D triplet 21*a*. This is also the case between the third and fourth rows, and between the fifth and sixth rows, and so on.

However, in this embodiment, as a refinement, the internal colour order within adjacent 2-D triplets in the column direction 6 has indeed been rotated (or shifted) between the second and third rows, and between the third and fifth rows, and so on. It is to be noted, however, that such rotation between the rows, i.e. in the column direction 6, is not essential, and for example in other embodiments, the internal colour order within adjacent 2-D triplets is rotated in the row direction 4 as described above in FIGS. 3 and 4, however there is no rotation of the internal colour order within adjacent 2-D triplets between any of the rows in the column direction 6, in other words the colour order of the first row is repeated in all the rows, e.g. all rows have a repeating triplet order of R-G-B then G-B-R then B-R-G and so on in the case of such an alternative version of the above described embodiment.

Yet further embodiments of switchable (between autostereoscopic operation and 2-D operation) colour display apparatus 8 will now be described with reference to FIGS. 5 and 6. In these further embodiments, the apparatus details are the same as those of the embodiments described above, and like parts are indicated by like reference numerals, except that different colour layouts of the colour filter 13 are provided as described below, and except where otherwise stated.

Figure 5:
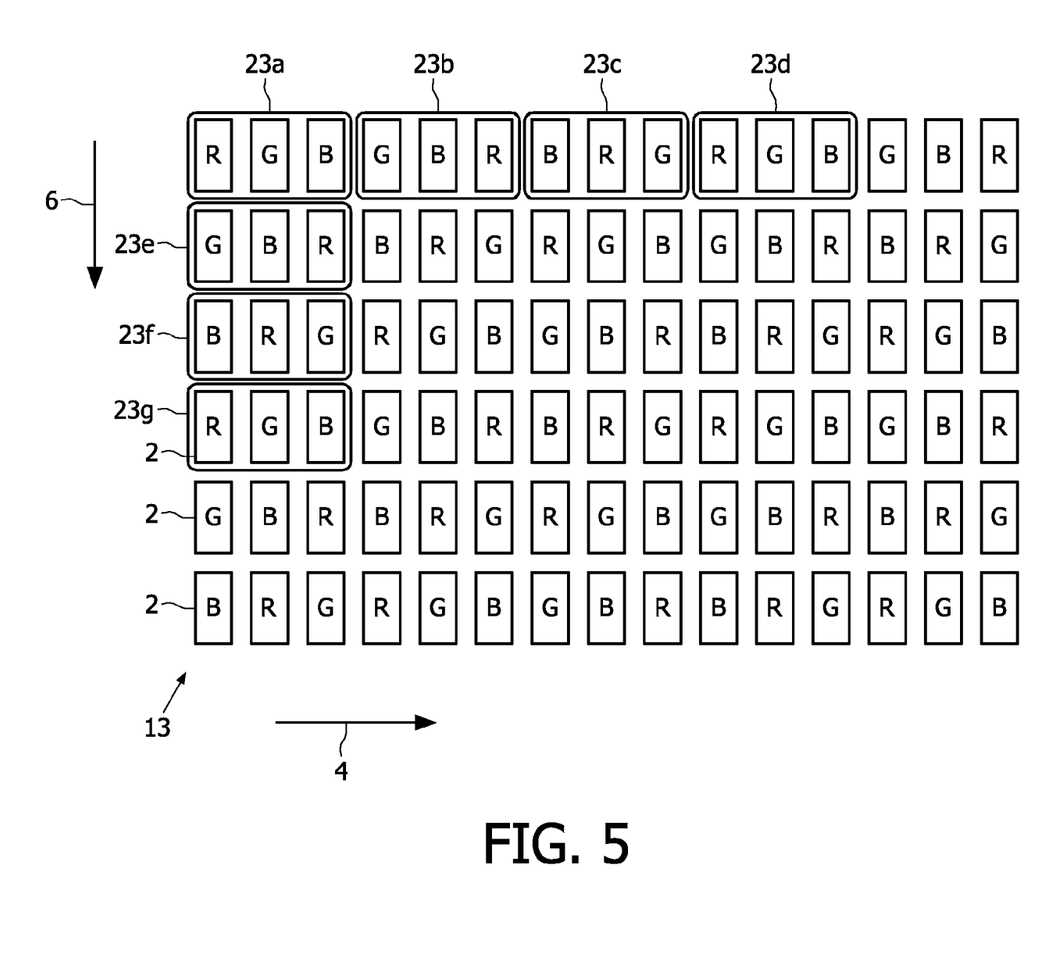
FIG. 5 shows the colour filter of a further example of a switchable (between autostereoscopic operation and 2-D operation) colour display apparatus.

FIG. 5 shows the colour filter 13 of such a further embodiment of a switchable (between autostereoscopic operation and 2-D operation) colour display apparatus 8. In this embodiment the autostereoscopic display 10 is again a 6-view display, that is the lenticular elements 16 (not shown) are of such a width with respect to the pitch of the individually addressable display elements 2 in a row, and the slant angle α is such as to provide a 6-view arrangement (here α=arctan(⅙)).

The individually addressable display elements 2 are arranged in the following colour layout:

along the first row, a repeating occurrence of the following order: R-G-B-G-B-R-B-R-G;

along the second row, a repeating occurrence of the following order: G-B-R-B-R-G-R-G-B;

along the third row, a repeating occurrence of the following order: B-R-G-R-G-B-G-B-R;

along the fourth row a repeat of the first row;
along the fifth row a repeat of the second row;
along the sixth row a repeat of the third row;
along the seventh row (not shown) a repeat of the first and fourth rows; and so on.

Thus, in this embodiment, the internal colour order within adjacent 2-D triplets is rotated (or shifted) both along each row, in the row direction 4, and between each row, in the column direction 6.

More particularly, in the row direction 4, the internal colour order within adjacent 2-D triplets is rotated as follows, taking the first row by way of example, along the first row: the first 2-D triplet 23a has internal colour order R-G-B; then the second 2-D triplet 23b which is adjacent the first 2-D triplet 23a is rotated relative to the first 2-D triplet 23a to have internal colour order G-B-R; then the third 2-D triplet 23c which is adjacent the second 2-D triplet 23b is rotated relative to the second 2-D triplet 23b to have internal colour order B-R-G; then the fourth 2-D triplet 23d which is adjacent the third 2-D triplet 23c is rotated relative to the third 2-D triplet 23c to have internal colour order R-G-B (i.e. has returned to the internal colour order of the first 2-D triplet 23a); and so on.

Also, more particularly, in the column direction 6, the internal colour order within adjacent 2-D triplets is rotated as follows, taking the first column by way of example, down the first column: the 2-D triplet 23a of the first row has internal colour order R-G-B; then the 2-D triplet 23e of the second row, which triplet is adjacent the 2-D triplet 23a of the first row, is rotated relative to the 2-D triplet 23a of the first row to have internal colour order G-B-R; then the 2-D triplet 23f of the third row, which triplet is adjacent the 2-D triplet 23e of the second row, is rotated relative to the 2-D triplet 23e of the second row to have internal colour order B-R-G; then the 2-D triplet 23g of the fourth row, which triplet is adjacent the 2-D triplet 23f of the third row, is rotated relative to the 2-D triplet 23f of the third row to have internal colour order R-G-B; (i.e. has returned to the internal colour order of the first 2-D triplet 23a); and so on.

Thus in this embodiment, the approach of rotating the internal colour order of adjacent 2-D triplets has been applied in both the row direction 4 and the column direction 6. This again gives improved performance in autostereoscopic mode, whilst achieving good 2-D operation also.

A further embodiment, in which the approach of rotating the internal colour order of adjacent 2-D triplets is applied in the column direction 6 but not the row direction 4, will now be described with reference to FIG. 6.

Figure 6:
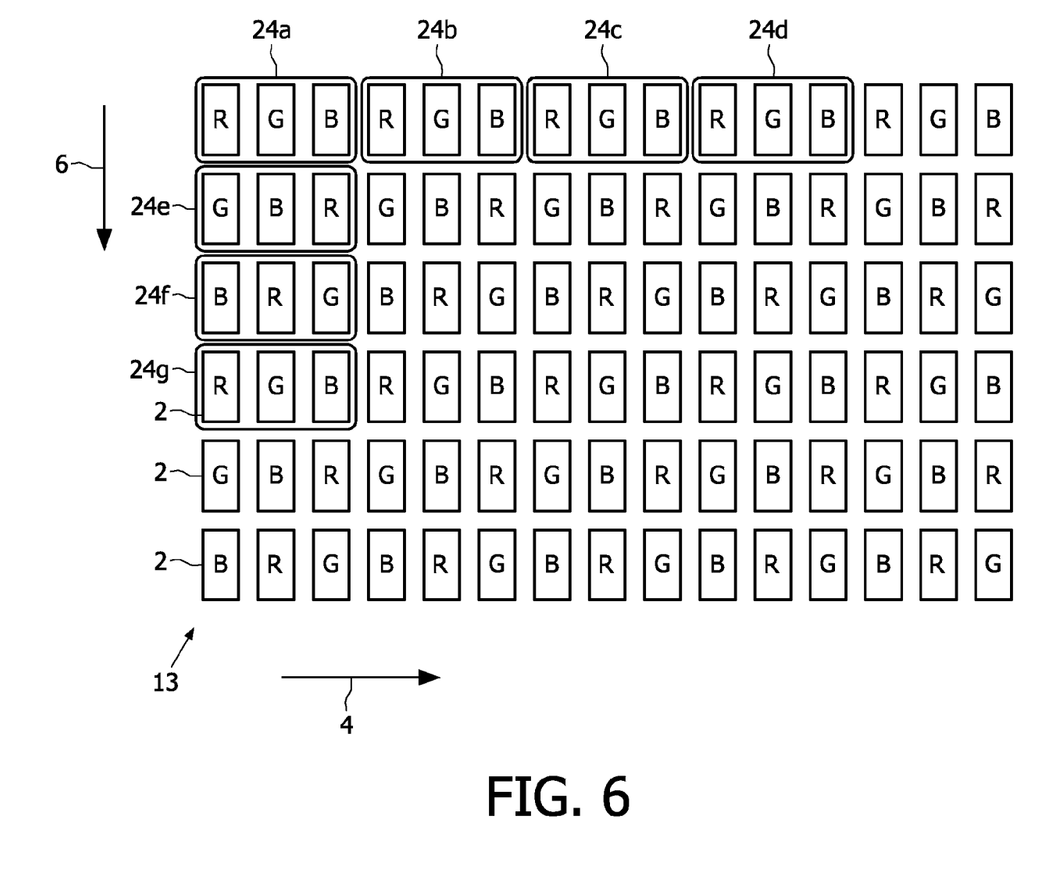
FIG. 6 shows the colour filter of a further example of a switchable (between autostereoscopic operation and 2-D operation) colour display apparatus.

FIG. 6 shows the colour filter 13 of such a further embodiment of a switchable (between autostereoscopic operation and 2-D operation) colour display apparatus 8. In this embodiment the autostereoscopic display 10 is a 4-view display, that is the lenticular elements 16 (not shown) are of such a width with respect to the pitch of the individually addressable display elements 2 in a row, and the slant angle α is such as to provide a 4-view arrangement (here α=arctan(⅓)).

The individually addressable display elements 2 are arranged in the following colour layout:

along the first row, a repeating occurrence of the following order: R-G-B-R-G-B-R-G-B (i.e. the triplet R-G-B is simply repeated);

along the second row, a repeating occurrence of the following order: G-B-R-G-B-R-G-B-R (i.e. the triplet G-B-R is simply repeated);

along the third row, a repeating occurrence of the following order: B-R-G-B-R-G-B-R-G (i.e. the triplet B-R-G is simply repeated);

along the fourth row a repeat of the first row;
along the fifth row a repeat of the second row;
along the sixth row a repeat of the third row;
along the seventh row (not shown) a repeat of the first and fourth rows; and so on.

Thus, in this embodiment, the internal colour order within adjacent 2-D triplets is not rotated (or shifted) along each row, in the row direction 4; however the internal colour order within adjacent 2-D triplets is rotated (or shifted) between each row, in the column direction 6.

More particularly, in the row direction 4, the internal colour order within adjacent 2-D triplets is kept the same, thus for example along the first row all of the 2-D triplets, including the 2-D triplets indicated by reference numerals 24a, 24b, 24c and 24d, have the same internal colour order R-G-B.

However, in the column direction 6, the internal colour order within adjacent 2-D triplets is rotated as follows, taking the first column by way of example, down the first column: the 2-D triplet 24a of the first row has internal colour order R-G-B; then the 2-D triplet 24e of the second row, which triplet is adjacent the 2-D triplet 24a of the first row, is rotated relative to the 2-D triplet 24a of the first row to have internal colour order G-B-R; then the 2-D triplet 24f of the third row, which triplet is adjacent the 2-D triplet 24e of the second row, is rotated relative to the 2-D triplet 24e of the second row to have internal colour order B-R-G; then the 2-D triplet 24g of the fourth row, which triplet is adjacent the 2-D triplet 24f of the third row, is rotated relative to the 2-D triplet 24f of the third row to have internal colour order R-G-B; (i.e. has returned to the internal colour order of the first 2-D triplet 24a); and so on.

Thus in this embodiment, the approach of rotating the internal colour order of adjacent 2-D triplets has only been applied in the column direction 6, i.e. not also in the row direction 4. This shows how for different design constraints (here a 4-view autostereoscopic display) different layouts may be desirable for the autostereoscopic view, nevertheless either or both of row direction and column direction 2-D triplet internal colour rotation allows such autostereoscopic improvement to be achieved whilst maintaining or providing relatively good 2-D performance.

It will be apparent from the above described embodiments that the present invention may be embodied in any of the following ways:

a) the colour order within 2-D triplets is changed in the row direction, i.e. along a row, but is not changed in the column direction, i.e. is not changed from row to row;

b) the colour order within 2-D triplets is changed in the column direction, i.e. from row to row, but is not changed in the row direction, i.e. along a row; or c) the colour order within 2-D triplets is changed in both the row direction, i.e. along a row, and in the column direction, i.e. from row to row.

In the above described embodiments, the sense in which the internal colour order of the 2-D triplets is rotated is such that when, in a first 2-D triplet, green is the middle colour (e.g. R-G-B), then in the adjacent 2-D triplet along the row (working along the row from left to right) the colours are rotated to the left such that green is now the left-hand colour (i.e. G-B-R), and so on. However, in other embodiments, such rotation may take place in the opposite sense, i.e. the colours are rotated to the right, such that when green is the middle colour of a first 2-D triplet (e.g. R-G-B), then in the adjacent 2-D triplet along the row (working along the row from left to right) the colours are rotated to the right such that green is now the right-hand colour (i.e. B-R-G), and so on.

Furthermore, in embodiments where the internal colour order of the 2-D triplets is rotated in both the row direction and the column direction, then the rotation may be in one sense (right- or left-handed as described in the previous paragraph) for one of the row direction or column direction, and in the other sense (left- or right-handed) for the other of the row direction or column direction.

The rotation of the internal colour order of the 2-D triplets, as described for the different embodiments above, is a particularly advantageous way of providing a restraint on the colour layout that maintains relatively good 2-D visual performance, whilst allowing design freedom to design layouts that provide enhanced or adequate 3 autostereoscopic performance. In particular, the rotation approach of the above described embodiments ensures that adjacent individually addressable display elements in the direction in which rotation is implemented are not the same colour as each other, and also that 2-D triplets are maintained in the form of adjacent individually addressable display elements. However, such rotation is not the only way in which such desirable performance in the 2-D mode can be achieved whilst allowing design freedom for the autostereoscopic mode, and hence in other embodiments, other 2-D layouts other than strict rotation may be employed. For example, the internal colour order within adjacent triplets may be varied in a more variable manner than the above described embodiments, whilst achieving, for example, a criterion that adjacent individually addressable display elements in the direction in which colour order change is implemented are not the same colour as each other, or at least that in the case of the majority of triplets along a row (and/or in the column direction) adjacent individually addressable display elements in the direction in which colour order change is implemented are not the same colour as each other, for example R-G-B-G-R-B-G-B-R-B-R-G-R-G-B-G-R-B-G-B-R-B-R-G-G-R-B-R-G-B-....

There are a number of factors that the skilled person may need to consider when implementing colour layout design with a view to improving autostereoscopic performance, or otherwise taking account of the autostereoscopic operation, for example designing the colour layout with the intent to provide improved design flexibility. Such factors include the size of the individually addressable display elements, the pitch of the individually addressable display elements, the number of views to be achieved, details of the lenticular lens, including the pitch and width of the lenticular elements thereof, the value of any slant angle of the lenticular lens relative to the array of individually addressable display elements, and so on. Certain colour layouts beneficial for certain autostereoscopic design constraints are presented in the embodiments described above. However, such embodiments are only a few examples of a very wide range of possibilities available to the skilled person wishing to develop colour layouts for autostereoscopic effect, and it is to be appreciated that the present invention is applicable to this wide range of possibilities. Thus the present invention is not limited to the particular autostereoscopic colour layouts (i.e. derived from a combination of the colour layout of the individually addressable display elements with the lenticular lens characteristics) described above, rather the present invention is applicable to any autostereoscopic colour layout provided by any combination of the colour layout of the individually addressable display elements with the lenticular lens characteristics, provided that the colour layout of the individually addressable display elements is such as to provide the above described ways of achieving desirable performance in the 2-D mode, for example by the rotation of the internal colour order of the 2-D triplets, or other variations in the internal colour order of the 2-D triplets. It is also to be appreciated that the suitability of any envisaged autostereoscopic layouts designed under the 2-D layout constraints provided by the present invention may easily and routinely be assessed by the skilled person in any of a number of ways, for example by using simulations, trial and error, and so on. That is, following from the present description, it is readily within the ambit of the skilled person to try out different colour layouts following the restraints of the above described rotation or change of internal colour order between adjacent 2-D triplets as described above, and to then model or otherwise assess the resulting autostereoscopic and 2-D performance (e.g. in terms of spatial resolution, number of views etc.) to assess the usefulness of any particular layout he or she has formulated.

In the above described embodiments, the colour order within 2-D triplets is changed, e.g. rotated, for directly adjacent 2-D triplets in the row direction and/or the column direction. However, such rotation (or other change) need not take place in directly adjacent 2-D triplets, and instead, in other embodiments, such rotation (or other change) may take place in just some, not necessarily adjacent, 2-D triplets in the row direction and/or the column direction. For example, the rotation (or other change) may be implemented, in the row direction, only in every second 2-D triplet along a row; and/or in the column direction, only in every second row.

In the above described embodiments, the internal colour layout of the first 2-D triplet of the first row is R-G-B. However, this need not be the case, and in other embodiments this may be in any other order, i.e. R-B-G, G-B-R, G-R-B, B-R-G, or B-G-R.

Moreover, although in the above described embodiments the colours are red, green and blue, this need not be the case, and in other embodiments, other colours may be used, for example cyan, magenta and yellow.

Furthermore, in other embodiments, there may be more than three colours, for example in other embodiments the individually addressable display elements may be of four colours, e.g. red, green, blue and "white", in which the grouping of one individually addressable display element of each colour, referred to herein in conventional manner as a triplet, may in fact comprise four individually addressable display elements, despite the literal meaning of the word "triplet". Similarly, the term "triplet" as used herein encompasses embodiments where there are unequal numbers of red green and blue individually addressable display elements, for examples displays where a pixel ("triplet" as used herein) comprises one blue individually addressable display element, two red individually addressable display elements and two green individually addressable display elements.

In the above described embodiments, a lenticular sheet (lens) comprising longitudinal lenticular elements is used to direct light to different locations to provide autostereoscopic operation. However, in other embodiments, any other appropriate light directing means for carrying out such light directing may be employed instead.

In the above described embodiments, the lenticular sheet is arranged at a slanted angle to the column direction. However, this need not be the case, an din other embodiments the lenticular sheet may be arranged substantially parallel with the column direction.

In the above described embodiments, the pitch of the lenticular elements of the lenticular sheet is chosen in relation to the pitch of the individually addressable display elements in the row direction to provide multi-view (i.e. more than two views) autostereoscopic operation. In particular examples of 6-view and 4-view are described above. However, this need not be the case, and in other embodiments the autostereoscopic display only provides a "2-view image", i.e. a single 3-D image. Also, considering again multi-view embodiments, numbers of views other than 4 or 6 may be provided, e.g. 7-view, 9-view, and even fractional numbers of views, e.g. 4.5.

In the above embodiments, the various forms of the colour filter are employed in switchable (between autostereoscopic operation and 2-D operation) colour display apparatus. This is a particularly beneficial use of the above described colour filter layouts, due to their provision advantages to both autostereoscopic operation and 2-D operation. However, it will be appreciated that advantages are nevertheless derived when the above described colour filter layouts are used for autostereoscopic mode alone, i.e. even if not actually used in 2-D operation, and hence the present invention is also embodied in autostereoscopic colour display apparatus comprising such colour filters, even when such autostereoscopic colour display apparatus is not switchable to a 2-D mode, i.e. such apparatus do not comprise a switchable diffuser.

In the above embodiments, when the display device is provided in switchable form between 2-D mode and stereoscopic mode, such switching capability is provided by a switchable diffuser. However, this need not be the case, and in other embodiments, other switchable means are provided, for example active lenses, e.g. liquid crystal lenses, as described for example in U.S. Pat. No. 6,069,650, the contents of which are contained herein by reference.

Moreover, the present invention is also embodied in colour filters per se with colour filter layouts such as those described in the embodiments above. In this case, where the terminology "individually addressable display element" is used above to refer to an effective coloured display element resulting from the presence of the relevant area of the colour filter itself, in the case of a discrete colour filter the individual colour elements 2 may be conveniently termed "individual colour filter elements 2", and the details described in the above embodiments with respect to the relative colour layout of the differently coloured individually addressable display elements applies in corresponding fashion above to the relative colour layout of the differently coloured individual colour filter elements of embodiments of such a colour filter.

It will be appreciated that various known refinements to autostereoscopic display apparatus may readily be applied to embodiments of the present invention. For example, to reduce brightness variations, the lenticular lens may be arranged to operate in a defocused manner.

In the above described embodiments, the invention is embodied in an active colour matrix liquid crystal display. However, in other embodiments the invention may be embodied in other forms of colour array display devices, for example organic light emitting diode (OLED) display devices or "electronic-ink" display devices.

In the above described embodiments the invention is embodied in a direct-view display apparatus. However, in other embodiments the invention may be embodied in a projection display apparatus, such as that described in EP-A-0 791 847, whose contents are incorporated herein by reference.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. An autostereoscopic display apparatus comprising:
a plurality of colored individually addressable light emitting diode display elements arranged in an array of rows and columns;
a plurality of light directing lenticular elements;
a diffusion layer switchable between diffusing and non-diffusing, which in a diffusing state cancels out a light directional effect of the lenticular elements, reducing an autostereoscopic mode to a 2-D mode;
wherein an internal color order of 2-D triplets changes in at least one of a row and column direction for adjacent triplets is such that in the 2-D mode an inherent loss of spatial resolution is reduced;
wherein:
the lenticular elements that are arranged along a slanted direction with respect to the columns of individually addressable display elements and a pitch of the lenticular elements is chosen in relation to a pitch of the individually assignable display elements in the row direction according to the number of views required; and
the lenticular elements have a central axes extending along the slanted direction,
the lenticular elements have a width such that for each of a plurality of the rows, the central axis of the lenticular elements intersect a display element which of a different color than the central axes of the lenticular elements on either side,
the central axis of a first lenticular element pastes through a first display element of one triplet in a first row of a first color,
the central axis of a second lenticular element next to the first lenticular element passes through a display element of a second triplet of the first row, the second triplet display element being of a second color different than the first color, and
the central axis of one of the first and second lenticular elements passing through a display element of a subsequent row of a third color different from the first and second colors to define an autostereoscopic triplet.

2. The autostereoscopic display apparatus according to claim 1, wherein the central axis of each lenticular element passes through display elements of each color of the triplet cyclically.

3. The autostereoscopic display apparatus according to claim 1, wherein an internal color order of display elements of directly adjacent 2-D triplets changes and is rotated in both the row and column directions for adjacent 2-D triplets to improve 3-D performance while maintaining good 2-D spatial resolution.

4. The autostereoscopic display apparatus according to claim 3, wherein the color order of the triplets in a first two of the rows is the same and the color order in a next two rows is the same as each other and different from the color order in the first two rows.

5. The auto stereoscopic display apparatus according to claim 1, wherein there is one intervening row between the first and subsequent rows.

6. The autostereoscopic display apparatus according to claim 5, wherein the triplets are rotated in the rows, the first and intervening rows having a first rotation and the subsequent row having a different rotation.

7. The autostereoscopic display apparatus according to claim 1, further including:
an intervening row between the first row and the subsequent row.

8. An autostereoscopic display apparatus comprising:
a plurality of individual color filter elements arranged in an array of rows and columns, a color order of the color filter elements in a row direction providing triplets of adjacent individual color filter elements, each individual color filter element of a triplet being a respective one of a first color, a second color, and a third color, the first, second, and third colors being different from each other;
a switching unit which switches the autostereoscopic display apparatus between an autostereoscopic display mode and a 2D display mode;
a plurality of lenticular elements arranged adjacent to each other in parallel along a slanted direction with respect to the column direction,
a central axis of a first lenticular element passing through a color filter element of a first triplet of a first row, the first triplet color filter element being of the first color,
the central axis of a second of lenticular elements next to the first lenticular element passing through a color filter element of a second triplet of the first row, the second triplet color filter element being of the second color, and
the central axis of one of the first and second lenticular elements passing through a color filter element of a subsequent row, the subsequent row color filter element being of the third color, such that the first, second, and third triplet color filter elements of the first, second, and third color define an autostereoscopic triplet.

9. The autostereoscopic display device according to claim 8, wherein an internal color order of the individual color filter elements within a triplet is different for each adjacent triplet in both of the row direction and the column direction, the internal color order within each triplet being rotated or shifted along the row direction and the column direction.

10. The autostereoscopic display device according to claim 9, wherein the internal color order of the individual color filter elements within each triplet is rotated to be different in each group of three consecutive triplets in of the row direction and in pairs of rows in the column direction.

11. The autostereoscopic display device according to claim 9, wherein the internal color order of the individual color filter elements within a triplet is different for different triplets in the row direction such that adjacent individual color filter elements in the row direction are always of different color relative to each other.

12. The autostereoscopic display apparatus according to claim 8, wherein the switching unit includes one of:
an active lens, and
a switchable diffuser.

13. The autostereoscopic display apparatus according to claim 8, wherein the lenticular elements have a width such that the central axes of the lenticular elements intersect, in a plurality of the rows, filter elements of different colors, cyclically.

14. The autostereoscopic display apparatus according to claim 13, wherein the central axis of each lenticular element passes through filter elements of each color, cyclically.

15. The auto stereoscopic display apparatus according to claim 8, wherein the color filter elements of the autostereoscopic triplet are arranged in a triangle.

16. An autostereoscopic display apparatus
switchable between a 3D mode for providing autostereoscopic views and a 2D mode, comprising:
a plurality of colored individually addressable display elements arranged in an array of rows in a row direction and columns in a column direction;
a lenticular sheet comprising a plurality of longitudinal lenticular elements, the longitudinal lenticular elements being arranged such that:
central axes of the lenticular elements are slanted at an angle relative to the column direction,
a central axis of a first of the lenticular elements of the lenticular sheet passes through a first color filter element of a first triplet, the first color filter element of the first triplet being of a first color,
the central axis of a second of the lenticular elements next to the first lenticular element passes through a color filter element of a second triplet, the color filter element of the second triplet being of a second color different than the first color, and
the central axis of one of the first and second lenticular elements passes through a color filter element of a third triplet, the color filter element of the third triplet being of a third color different from the first and second colors, such that the color filter elements of the first, second, and third colors define the triangular triplet;
a color order of the individually addressable display elements in the row direction defines 2D color pixels in the form of triplets of adjacent individually addressable display elements in the row direction, each individually addressable display element of each 2D color pixel being a different color; and
wherein the color order of the individually addressable display elements within the 2D color pixels is different for different 2D color pixels in at least one of the row direction and the column direction; and
a switching unit which switches the autostereoscopic display apparatus between:
a 2-D display mode in which the individually addressable display elements are driven such that the individually addressable display elements of a respective one of said 2D color pixel triplets in the row direction combine to define one of the 2D color pixels, and
an autostereoscopic mode in which the individually addressable display elements are driven such that three individually addressable display elements, one of each color and spanning at least two rows provide a triangular triplet of individually addressable display elements which combine to define a 3D pixel.

17. The autostereoscopic display apparatus according to claim 16, wherein the internal color order of the individually addressable display elements within each 2D triplet is rotated between different 2D triplets in at least one of the row direction and the column direction.

18. The autostereoscopic display apparatus according to claim 16, wherein the internal color order of the individually addressable display elements within the 2D triplets is different for different 2D triplets in at least one of the row direction and the column direction such that adjacent individually addressable display elements in the at least one of the row direction and the column direction are always of different color to each other.

* * * * *